United States Patent
Nishikawa (10) Patent No.: US 7,809,483 B2
(45) Date of Patent: Oct. 5, 2010

(54) VEHICLE STEERING CONTROL DEVICE AND VEHICLE STEERING CONTROL METHOD

(75) Inventor: Norihisa Nishikawa, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 416 days.

(21) Appl. No.: 11/866,733

(22) Filed: Oct. 3, 2007

(65) Prior Publication Data

US 2008/0091321 A1 Apr. 17, 2008

(30) Foreign Application Priority Data

Oct. 13, 2006 (JP) .............................. 2006-280330

(51) Int. Cl.
*A01B 69/00* (2006.01)

(52) U.S. Cl. .......................... 701/41; 180/167; 318/586

(58) Field of Classification Search .................. 701/41; 180/167; 318/586
See application file for complete search history.

(56) References Cited

U.S. PATENT DOCUMENTS

| 6,256,561 B1 * | 7/2001 | Asanuma ...................... 701/41 |
| 6,324,452 B1 * | 11/2001 | Ikegaya ....................... 701/41 |
| 6,338,015 B1 * | 1/2002 | Kawagoe et al. .............. 701/41 |

FOREIGN PATENT DOCUMENTS

| DE | 197 51 125 A1 | 9/1998 |
| DE | 197 16 201 A1 | 10/1998 |
| DE | 600 21 952 T2 | 5/2006 |
| DE | 10 2005 004 727 A1 | 8/2006 |
| JP | 2000-66726 | 3/2000 |
| JP | 2004-34751 | 2/2004 |
| JP | 2005-324744 | 11/2005 |

* cited by examiner

*Primary Examiner*—Mark Hellner
(74) *Attorney, Agent, or Firm*—Oblon, Spivak, McClelland, Maier & Neustadt, L.L.P.

(57) ABSTRACT

A vehicle steering control device capable of executing automatic steering and manual steering includes: an automatic control amount-setting device that sets a target automatic control amount based on information about vehicle behavior and ambient environment; a steering control amount-setting device that sets a target steering amount based on a manual steering amount input by a driver and the set target automatic control amount; and a steering device that steers based on the set target steering amount. When the target automatic control amount contributes more in the setting of the target steering amount than the manual steering amount does, the steering control amount-setting device sets the target steering amount so as to better the responsiveness in the lateral shift of the vehicle relatively to the responsiveness in the turning of the vehicle, in comparison with when the target automatic amount does not contribute more than the manual steering amount.

23 Claims, 13 Drawing Sheets

VEHICLE STEERING CONTROL DEVICE AND VEHICLE STEERING CONTROL METHOD

INCORPORATION BY REFERENCE

The disclosure of Japanese Patent Application No. 2006-280330 filed on Oct. 13, 2006 including the specification, drawings and abstract is incorporated herein by reference in its entirety.

BACKGROUND OF THE INVENTION

1. Field of the Invention

The invention relates to a vehicle steering control device and a vehicle steering control method and, more particularly, to a vehicle steering control device and vehicle steering control method that change control rules at the time of automatic steering.

2. Description of the Related Art

As a related-art vehicle steering control device, Japanese Patent Application Publication No. 2005-324744 (JP-A-2005-324744), for example, discloses a vehicular automatic steering device capable of selecting and disengaging an automatic steering control. In this disclosed technology, when the automatic steering control is selected, a front wheel steering control device starts the automatic steering control after a rear wheel steering control has stopped at a neutral position. When the selection of the automatic steering control is cancelled, the rear wheel steering control device starts the rear wheel steering control after the automatic steering control has stopped. Thus, this technology substantially avoids the discomfort caused to the driver and the like and prevents the wobbling of the vehicle at the time of the automatic steering control.

However, even with the technology in which the start timing of the automatic steering control is prescribed as described above, it sometimes happens that at the time of the automatic steering, the vehicle is not stable and the driver feels discomfort, in comparison with the time of the manual steering performed by the driver.

SUMMARY OF THE INVENTION

The invention provides a vehicle steering control device that can further stabilize the vehicle and make the driver feel secured and comfortable at the time of automatic steering.

A first aspect of the invention provides a vehicle steering control device capable of executing automatic steering and manual steering characterized by including: an automatic control amount-setting device that sets a target automatic control amount based on information about behavior of a vehicle and about ambient environment; a steering control amount-setting device that sets a target steering amount based on a manual steering amount input by a driver and the target automatic control amount set by the automatic steering amount-setting device; and a steering device that steers based on the target steering amount set by the steering control amount-setting device, wherein when a contribution of the target automatic control amount is larger in setting of the target steering amount than the contribution of the manual steering amount, the steering control amount-setting device sets the target steering amount so as to better a responsiveness in a lateral shift of the vehicle relatively to the responsiveness in turning of the vehicle, in comparison with when the contribution of the target automatic control amount is equal to or smaller in the setting of the target steering amount than the contribution of the manual steering amount.

According to this construction, when the contribution of the target automatic control amount is larger in the setting of the target steering amount than the contribution of the manual steering amount, the steering control amount-setting device sets the target steering amount so as to better the responsiveness in the lateral shift of the vehicle relatively to the responsiveness in the turning of the vehicle, in comparison with when the contribution of the target automatic control amount is equal to or smaller in the setting of the target steering amount than the contribution of the manual steering amount. When the construction of the target automatic control amount is larger in the setting of the target steering amount than the contribution of the manual steering amount, that is, when the vehicle is running under the automatic control, it is generally often the case that the responsiveness in the lateral shift is required more than the responsiveness in the turning at the time of the execution of a constant-speed run control or the like. Therefore, since during the automatic control, the steering control amount-setting device sets the target steering amount so as to better the responsiveness in the lateral shift relatively to the responsiveness of the turning, the stabilization of the vehicle can be further improved and the driver can be caused to feel secured and comfortable during the automatic steering.

The automatic control amount-setting device may set the target automatic control amount so that a predetermined vehicle speed is maintained, and therefore can be applied to the time of the CC control (cruise control).

Furthermore, the automatic control amount-setting device may set the target automatic control amount so that an inter-vehicle distance to a preceding vehicle is kept at a predetermined value, and therefore can be applied to the time of the ACC control (adaptive cruise control).

Furthermore, the automatic control amount-setting device may set the target automatic control amount so that the vehicle stays and runs in a predetermined lane, and therefore can be applied to the time of the LKA (lane keeping assist) control.

Furthermore, when the contribution of the target automatic control amount is larger in the setting of the target steering amount than the contribution of the manual steering amount, the steering control amount-setting device may set the target steering amount so that a phase delay of a lateral acceleration of the vehicle relative to the steering amount becomes small, in comparison with when the contribution of the target automatic control amount is equal to or smaller in the setting of the target steering amount than the contribution of the manual steering amount.

According to this construction, since during the automatic control, the steering control amount-setting device sets the target steering amount so that the phase delay of the lateral acceleration relative to the steering amount becomes small, it is possible to improve the responsiveness in the lateral shift during the automatic control.

Furthermore, the steering device may steer a front wheel and a rear wheel individually based on the target steering amount, and when the contribution of the target automatic control amount is larger in the setting of the target steering amount than the contribution of the manual steering amount, the steering control amount-setting device may set the target steering amount so that the steering amount of the rear wheel becomes large, in comparison with when the contribution of the target automatic control amount is equal to or smaller in the setting of the target steering amount than the contribution of the manual steering amount.

According to this construction, the steering device steers the front wheel and the rear wheel individually based on the target steering amount, and the steering control amount-setting device sets the target steering amount so that the steering amount of the rear wheel becomes large at the time of the automatic control. Therefore, the amount of the turning is restrained and, on the other hand, the responsiveness in the lateral shift further improves, so that the stabilization of the vehicle can be further improved and the driver can be caused to feel secured and comfortable.

A second aspect of the invention provides a vehicle steering control method capable of executing automatic steering and manual steering characterized by including: setting a target automatic control amount based on information about behavior of a vehicle and about ambient environment; setting a target steering amount based on a manual steering amount input by a driver and the set target automatic control amount; and steering based on the set target steering amount, wherein when a contribution of the target automatic control amount is larger in setting of the target steering amount than the contribution of the manual steering amount, the target steering amount is set so as to better a responsiveness in a lateral shift of the vehicle relatively to the responsiveness in turning of the vehicle, in comparison with when the contribution of the target automatic control amount is equal to or smaller in the setting of the target steering amount than the contribution of the manual steering amount.

According to the vehicle steering control device and method of the aspects of the invention, it is possible to further improve the stability of the vehicle at the time of the automatic steering and cause the driver to feel secured and comfortable.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE EMBODIMENTS

Hereinafter, vehicle steering control devices in accordance with embodiments of the invention will be described with reference to the accompanying drawings.

Figure 1:
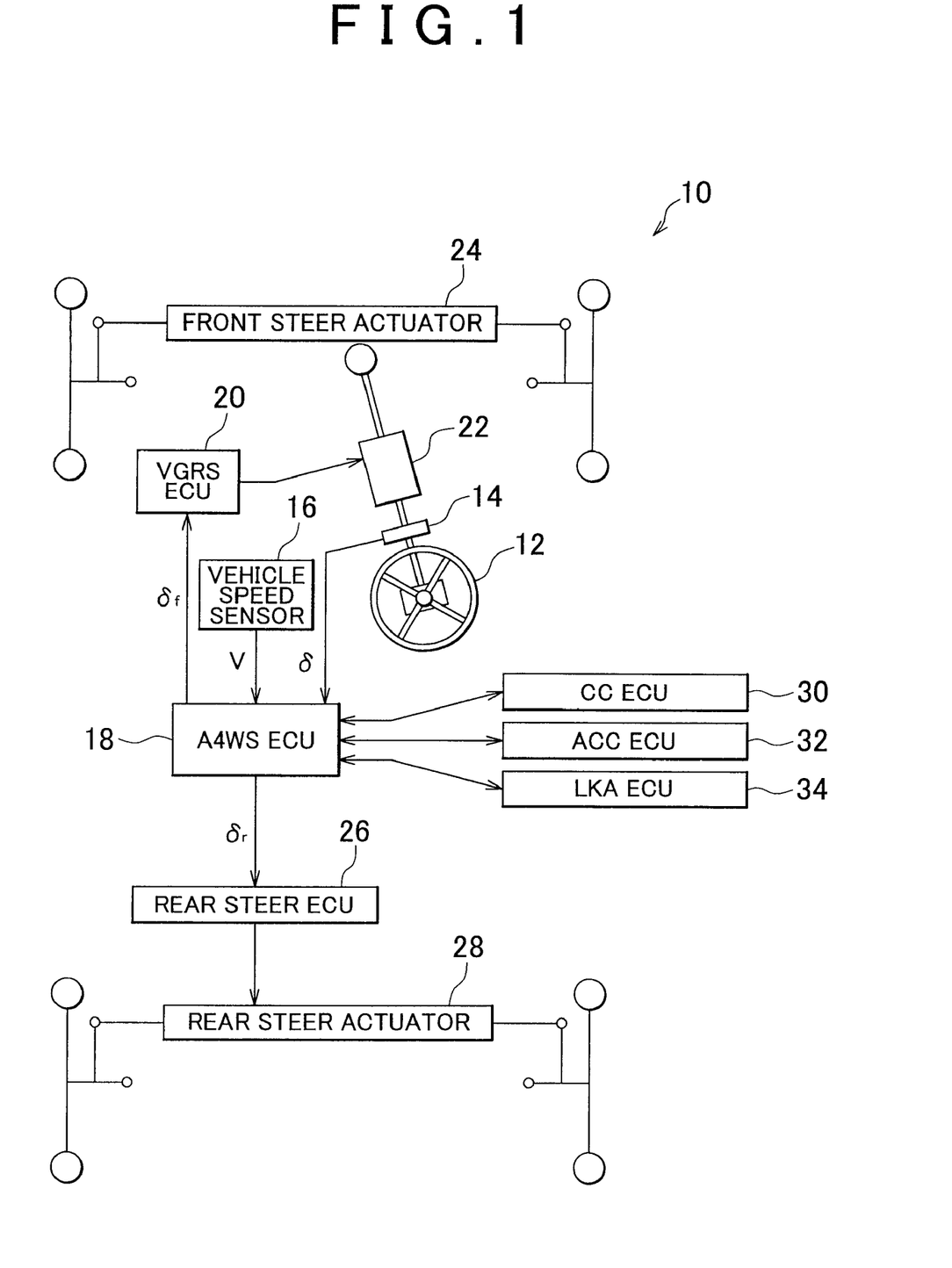
FIG. 1 is block diagram showing a construction of a vehicle steering control device in accordance with a first embodiment of the invention.

FIG. 1 is a block diagram showing a construction of a vehicle steering control device in accordance with a first embodiment of the invention. A vehicle steering control device of this embodiment is constructed so that either one of the manual steering and the automatic steering can be executed during the four-wheel steering, and steering control can be performed so as not to cause uncomfortable feeling to a driver at the time of the automatic steering.

As shown in FIG. 1, a vehicle steering control device 10 of this embodiment includes a steering handle 12 that a driver operates at the time of the manual steering, a VGRS (variable gear ratio steering) actuator 22 that changes the gear ratio of the front wheel steering, and a front steer actuator 24 that performs the steering of the front wheels. The vehicle steering control device 10 also includes a steering angle sensor 14 that detects the steering angle, and a vehicle speed sensor 16 that detects the vehicle speed. The information detected by these sensors is output to an A4WS (active four-wheel steering)-ECU 18.

The vehicle steering control device 10 includes a CC-ECU 30 that performs the CC control (cruise control), an ACC-ECU 32 that performs the ACC control (adaptive cruise control), and an LKA-ECU 34 that performs the LKA control (lane keeping assist control). These ECUs set predetermined target automatic control amounts on the basis of the vehicle behaviors and ambient environments detected by sensors and the like, such as the steering angle sensor 14, the vehicle speed sensor 16, etc. The CC-ECU 30, the ACC-ECU 32 and the LKA control LKA-ECU 34 function as an automatic control amount-setting device. The target automatic control amounts set by the CC-ECU 30, the ACC-ECU 32 and the LKA control LKA-ECU 34 are output to the A4WS-ECU 18.

The A4WS-ECU 18 is provided for setting target steering amounts on the basis of the manual steering amount input by the driver via the steering handle 12 as well as the target automatic control amounts set by the CC-ECU 30, the ACC-ECU 32 and the LKA-ECU 34. The A4WS-ECU 18 functions as a steering control amount-setting device. The A4WS-ECU 18 outputs the target steering amount set in this manner to a VGRS-ECU 20. The VGRS-ECU 20 outputs a drive signal to the VGRS actuator 22 so as to drive the front steer actuator 24. In this manner, the VGRS-ECU 20 performs the automatic steering of the front wheels. Besides, the A4WS-ECU 18 outputs the target steering amount set in the foregoing manner to a rear steer ECU 26. The rear steer ECU 26 performs the automatic steering of the rear wheels by outputting a drive signal to a rear steer actuator 28 to drive the rear steer actuator 28. Therefore, the front steer actuator 24 and the rear steer actuator 28 function as a steering device.

Next, operations of the vehicle steering control device of the embodiment will be described. Firstly, a steering control in the two-wheel steering will be described. The control rule in the two-wheel steering is expressed by the following expressions (1) to (3).

EXPRESSION 1

$$\frac{\gamma(s)}{\delta(s)} = \frac{\omega_n^2}{s^2 + 2\cdot\zeta\cdot\omega_n\cdot s + \omega_n^2}\cdot G_\gamma\cdot(1 + T_\gamma\cdot s)\cdot\frac{\delta_f(s)}{\delta(s)} \quad (1)$$

$$\frac{\beta(s)}{\delta(s)} = \frac{\omega_n^2}{s^2 + 2\cdot\zeta\cdot\omega_n\cdot s + \omega_n^2}\cdot G_\beta\cdot(1 + T_\beta\cdot s)\cdot\frac{\delta_f(s)}{\delta(s)} \quad (2)$$

$$\frac{LA(s)}{\delta(s)} = \frac{\omega_n^2}{s^2 + 2\cdot\zeta\cdot\omega_n\cdot s + \omega_n^2}\cdot G_{LA}\cdot\left(\frac{T_{LA2}\cdot s^2 +}{T_{LA1}\cdot s + 1}\right)\cdot\frac{\delta_f(s)}{\delta(s)} \quad (3)$$

In the foregoing expression, $\gamma$ is the yaw rate; $\beta$ is the slip angle; LA is the lateral acceleration; $\zeta$ is the damping coefficient determined from the vehicle specifications and the vehicle speed; $\omega_n$ is the eigenfrequency determined from the vehicle specifications and the vehicle speed; $G_\gamma$ is the yaw rate gain determined from the vehicle specifications and the vehicle speed; $G_\beta$ is the slip angle gain determined from the vehicle specifications and the vehicle speed; $G_{LA}$ is the lateral acceleration gain determined from the vehicle specifications and the vehicle speed; $T_\gamma$ is the yaw rate advancement time determined from the vehicle specifications and the vehicle speed; $T_\beta$ is the slip angle advancement time determined from the vehicle specifications and the vehicle speed; $T_{LA1}$ is the lateral acceleration advancement time 1 determined from the vehicle specifications and the vehicle speed; $T_{LA2}$ is the lateral acceleration advancement time 2 determined from the vehicle specifications; $\delta$ is the steering handle angle; and $\delta_f$ is the front wheel steering angle.

The value $\delta/\delta_f$ is the steering gear ratio. For example, $\delta/\delta_f=18.1$. In the case of two-wheel steering, when the steering handle is turned or operated, the front wheel steering angle is determined, so that the yaw rate, the slip angle and the lateral acceleration are determined.

Figure 2:
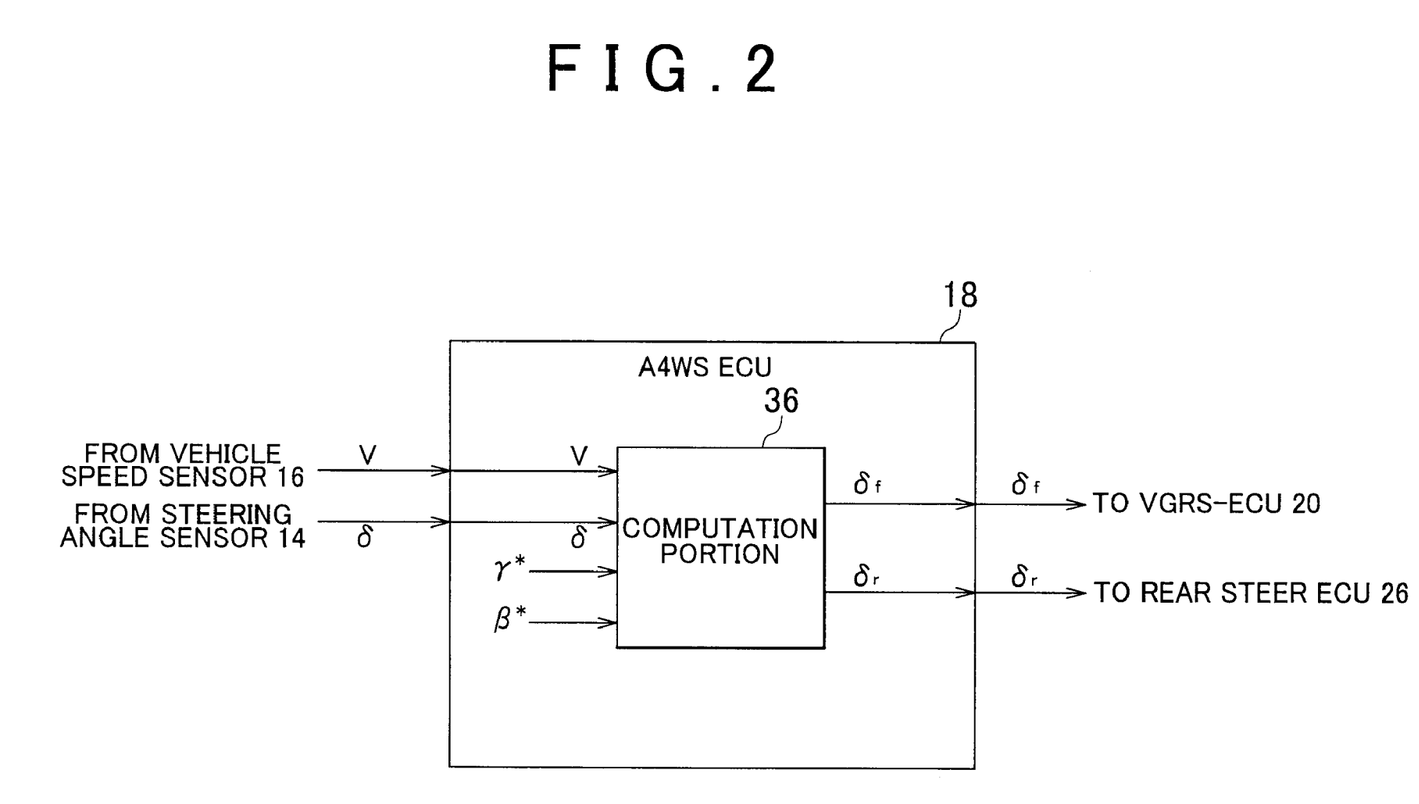
FIG. 2 is a block diagram showing a construction of an A4WS-ECU in accordance with the first embodiment.

FIG. 2 is a block diagram showing a construction of the A4WS-ECU in accordance with the first embodiment. In the case of four-wheel steering as in this embodiment, if the vehicle speed V, the steering handle angle $\delta$, a target yaw rate $\gamma^*$ and a target slip angle $\beta^*$ are given to a computation portion 36 of the A4WS-ECU 18, the front wheel steering angle $\delta_f$ and the rear wheel steering angle $\delta_r$ are determined.

Figure 3:
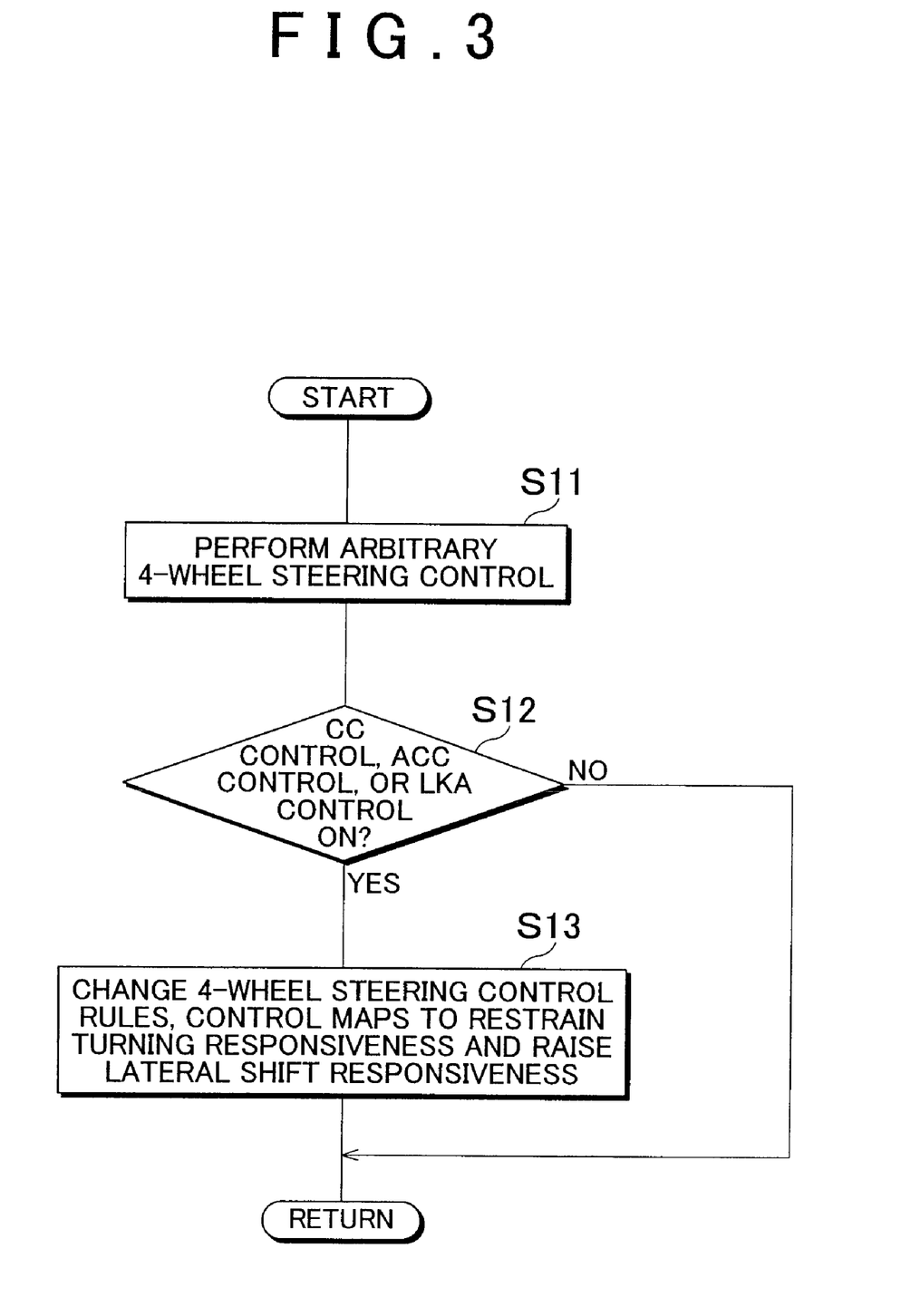
FIG. 3 is a flowchart showing an operation of the vehicle steering control device in accordance with the first embodiment.

FIG. 3 is a flowchart showing an operation of the vehicle steering control device in accordance with the first embodiment. This control operation is repeatedly executed at predetermined timing during a period from the turning on of the electric power source of the vehicle until the turning off thereof. As shown in FIG. 3, in the case where the vehicle steering control device 10 of the embodiment is performing an arbitrary four-wheel steering control (S11), the target yaw rate $\gamma^*$ and the target slip angle $\beta^*$ become as shown in the expressions (4) and (5) below.

EXPRESSION 2

$$\frac{\gamma^*(s)}{\delta(s)} = G_\gamma^*\cdot\frac{1}{1 + T\cdot s} \quad (4)$$

$$\frac{\beta^*(s)}{\delta(s)} = G_\beta^*\cdot\frac{1}{1 + T\cdot s} \quad (5)$$

Figure 4:
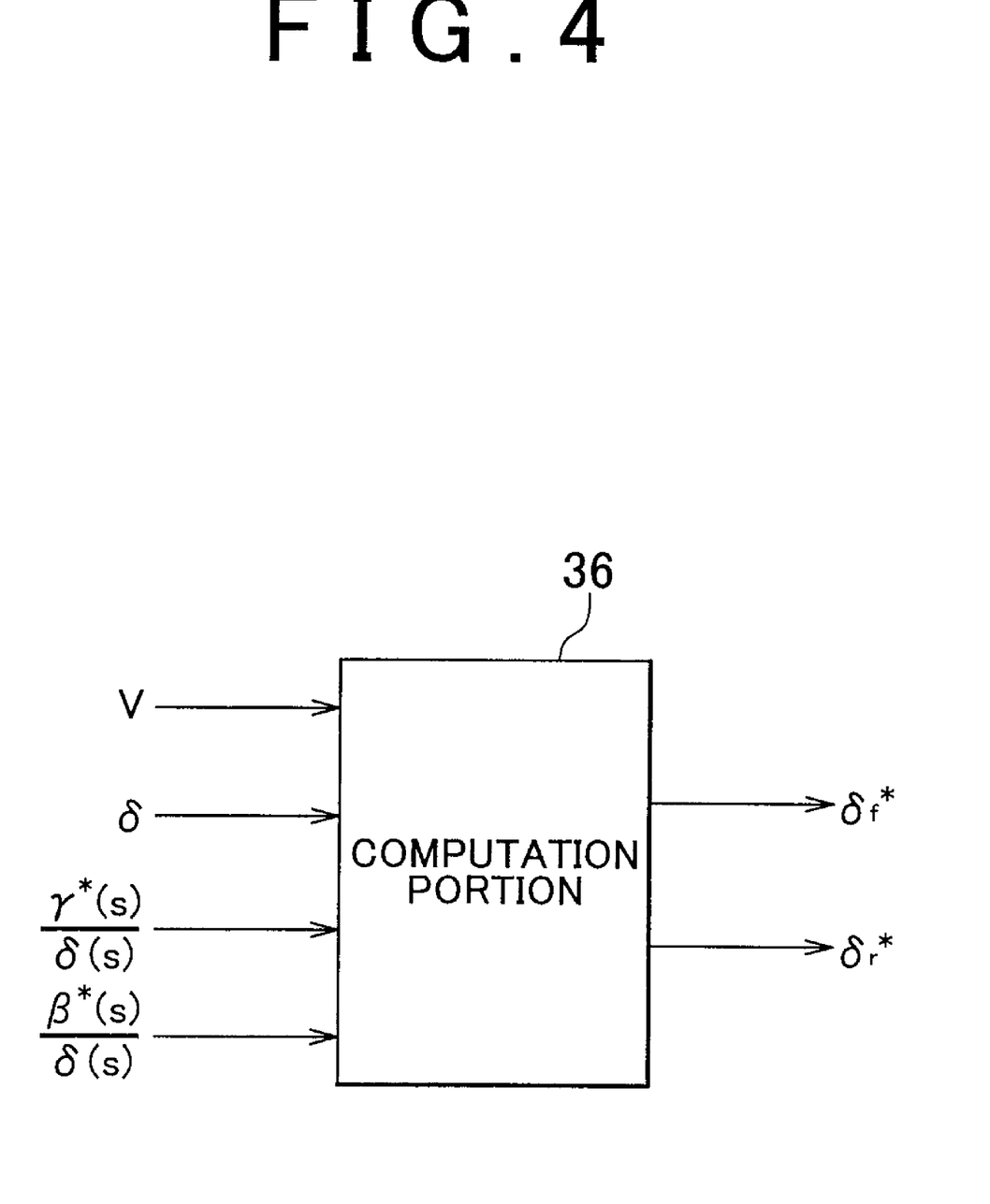
FIG. 4 is a block diagram showing a control rule of a computation portion at the time of the manual steering in accordance with the first embodiment.

At this time, the control rule of the target lateral acceleration LA* becomes as shown in the expression (6) below. As shown in FIG. 4, the computation portion 36 of the A4WS-ECU 18 calculates a front wheel steering angle $\delta^*_f$ and a rear wheel steering angle $\delta^*_r$ corresponding to the target lateral acceleration LA*.

EXPRESSION 3

$$\frac{LA^*(s)}{\delta(s)} = V\left(\frac{\gamma^*(s)}{\delta(s)} + s\cdot\frac{\beta^*(s)}{\delta(s)}\right) \quad (6)$$
$$= V\cdot\frac{G_\gamma^* + G_\beta^*\cdot s}{1 + T\cdot s}$$

Incidentally, in the expression (6), the relationship of the following expression (7) holds.

EXPRESSION 4

$$G^*_{\beta 2} \neq T\cdot G^*_\gamma \quad (7)$$

Figure 6:
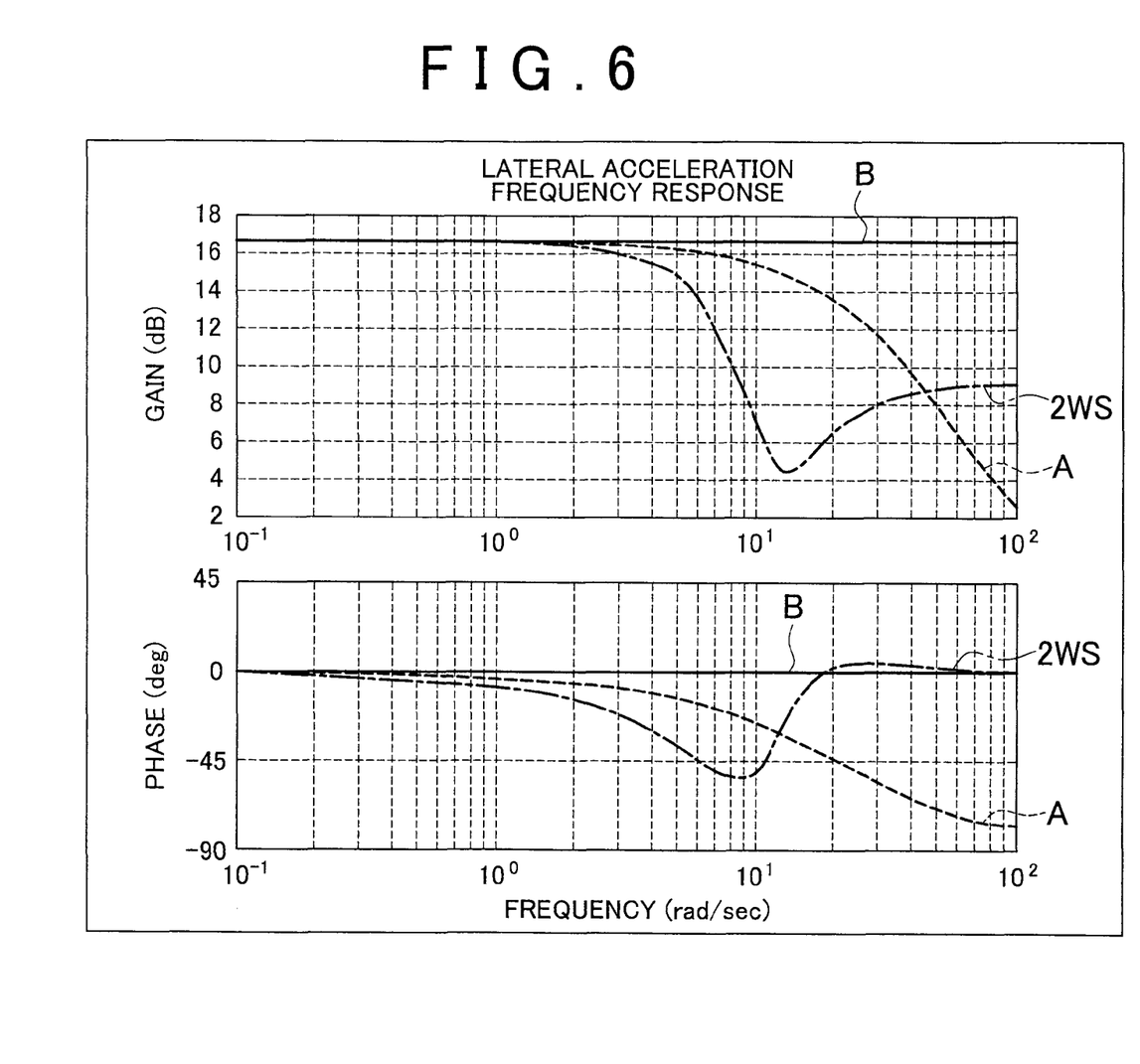
FIG. 6 is a Bode diagram showing a frequency response of the lateral acceleration of the control rule in accordance with the first embodiment.

In the vehicle steering control device 10 of the embodiment, when the contribution of the target automatic control amount is less than or equal to the manual steering amount in the setting of the target steering amount, that is, when the manual control is equivalent or more dominant in the setting of the target steering amount than the automatic control, in other words, when the steering is based on the manual control, target values are prepared as in the foregoing expressions (4) to (6). During this state, the lateral shift and the turning of the vehicle become substantially equal in responsiveness. FIG. 6 is a Bode diagram showing a frequency response of the lateral acceleration of the control rule in accordance with the first embodiment. As shown in FIG. 6, regarding a curve A of the frequency response of the lateral acceleration at the time of the manual steering, the higher the frequency, the lower the gain becomes, and the greater the phase delay becomes. In FIG. 6, a curve 2WS of the lateral acceleration of the two-wheel steering is also shown for reference.

As shown in FIG. 3, when any of the CC control, the ACC control and the LKA control is on (YES in S12), the vehicle steering control device changes the steering control rule to another so as to restrain the responsiveness in the turning of the vehicle and raise the responsiveness in the lateral shift of the vehicle (S13). Or, the vehicle steering control device may change steering control rules so as to restrain the responsiveness in the turning and raise the responsiveness in the lateral shift when the vehicle speed becomes equal to or higher than 80 km/h.

Figure 5:
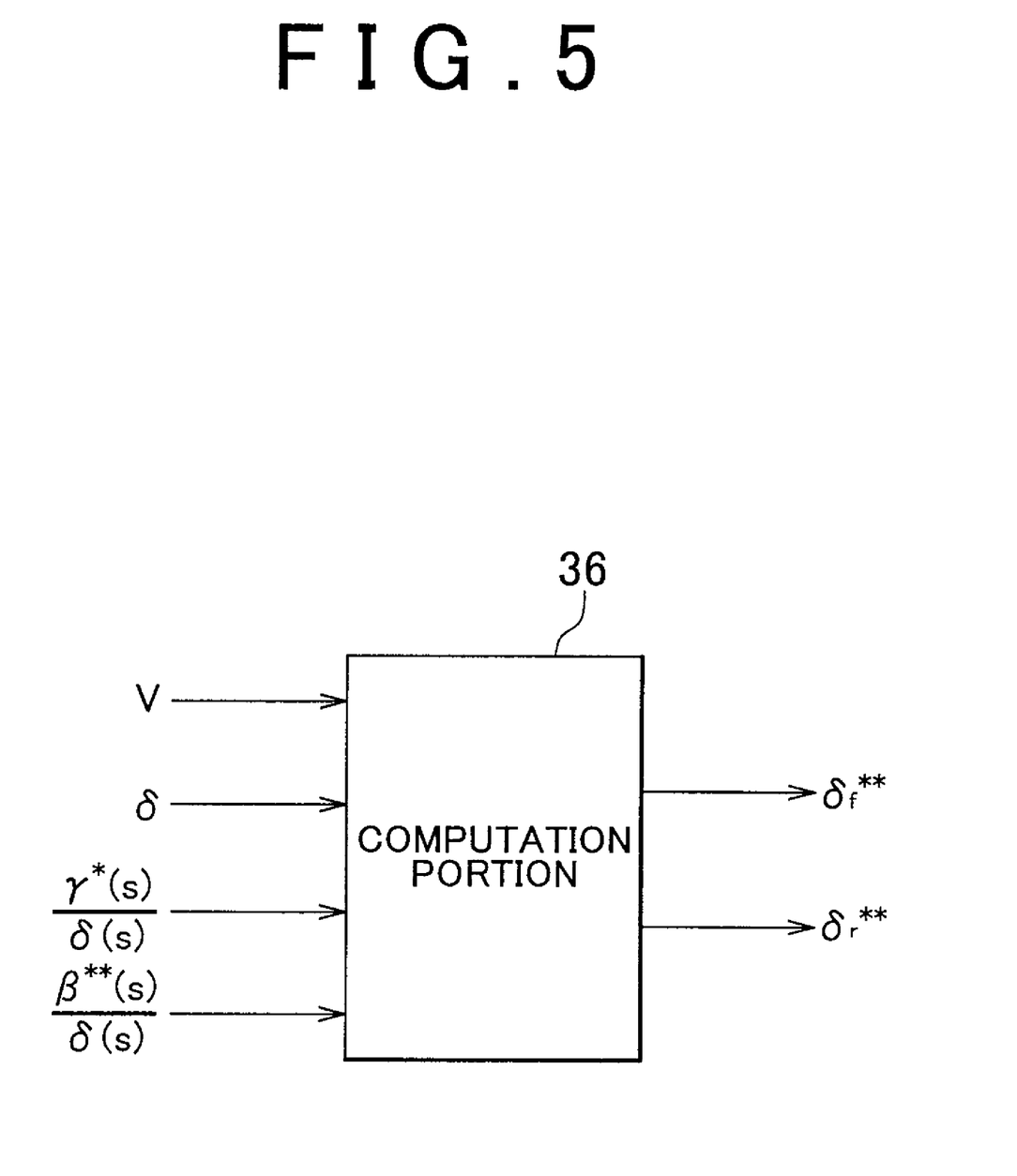
FIG. 5 is a block diagram showing a control rule of the computation portion at the time of the automatic steering in accordance with the first embodiment.

In that case, the relationship of the following expression (8) is assumed to hold, and the expression (9) is obtained so that the responsiveness in the lateral shift becomes maximum. Then, the control rule of the target lateral acceleration LA becomes as shown in the expression (10), so that as shown in FIG. 5, the computation portion 36 of the A4WS-ECU 18 calculates a front wheel steering angle $\delta^{}_f$ and a rear wheel steering angle $\delta^{}_r$ corresponding to the target lateral acceleration LA.

EXPRESSION 5

$$G^*_\beta \neq T\cdot G^*_\gamma \quad (8)$$

EXPRESSION 6

-continued $$\frac{\beta^{**}(s)}{\delta(s)} = T \cdot G_\beta^* \cdot \frac{1}{1+T \cdot s} \quad (9)$$

EXPRESSION 7

$$\frac{LA^{**}(s)}{\delta(s)} = V \cdot \left(\frac{G_\gamma^* + T \cdot G_\gamma^* \cdot s}{1+T \cdot s}\right) \quad (10)$$
$$= V \cdot G_\gamma^*$$

In this case, the phase delay of the lateral acceleration relative to the steering handle angle disappears, and the frequency response of the lateral acceleration becomes as shown by a curve B in FIG. 6.

According to this embodiment, during the execution of the CC control, the ACC control or the LKA control, during which the contribution of the target automatic control amount is greater in the setting of the target steering amount than the contribution of the manual steering amount, that is, when the automatic control is more dominant in the setting of the target steering amount than the manual control, the A4WS-ECU 18 sets the target steering amount so as to better the responsiveness in the lateral shift relatively to the responsiveness in the turning, in comparison with when the contribution of the target automatic control amount is less than or equal to the manual steering amount in the setting of the target steering amount. When the contribution of the target automatic control amount is larger in the setting of the target steering amount than that of the manual steering amount, that is, when the vehicle is running under an automatic control, such as the CC control, the ACC control, the LKA control, etc., it is generally often the case that the responsiveness in the lateral shift is required more than the responsiveness in the turning during the execution of a constant-speed run control or the like. Therefore, since during the automatic control, the A4WS-ECU 18 sets the target steering amount so as to better the responsiveness in the lateral shift relatively to the responsiveness in the turning, the stabilization of the vehicle can be further improved and the driver can be caused to feel secured and comfortable during the automatic steering.

Particularly, in this embodiment, since during the automatic control, the A4WS-ECU 18 sets the target steering amount so that the phase delay of the lateral acceleration relative to the steering amount becomes small, it is possible to improve the responsiveness in the lateral shift during the automatic control.

A second embodiment of the invention will be described below. This embodiment is different from the first embodiment in that the responsiveness in the lateral shift is improved by changing control maps at the time of the automatic steering.

In this embodiment, as shown in FIG. 3, in the case where the vehicle steering control device 10 of this embodiment is performing an arbitrary four-wheel steering control (S11), if the target yaw rate δ* and the target slip angle β* are prepared as in the following expressions (11) and (12), the control rule of the target lateral acceleration LA* becomes as shown in the following expression (13).

EXPRESSION 8

$$\frac{\gamma^*(s)}{\delta(s)} = \frac{\omega_n^{*2}}{s^2 + 2 \cdot \zeta^* \cdot \omega_n^* \cdot s + \omega_n^{*2}} \cdot (1 + T_\gamma^* \cdot s) \cdot G_\gamma^* \quad (11)$$

$$\frac{\beta^*(s)}{\delta(s)} = \frac{\omega_n^{*2}}{s^2 + 2 \cdot \zeta^* \cdot \omega_n^* \cdot s + \omega_n^{*2}} \cdot (1 + T_\beta^* \cdot s) \cdot G_\beta^* \quad (12)$$

EXPRESSION 9

$$\frac{LA^*(s)}{\delta(s)} = V \cdot \left(\frac{\gamma^*(s)}{\delta(s)} + s \cdot \frac{\beta^*(s)}{\delta(s)}\right) \quad (13)$$

Figure 11:
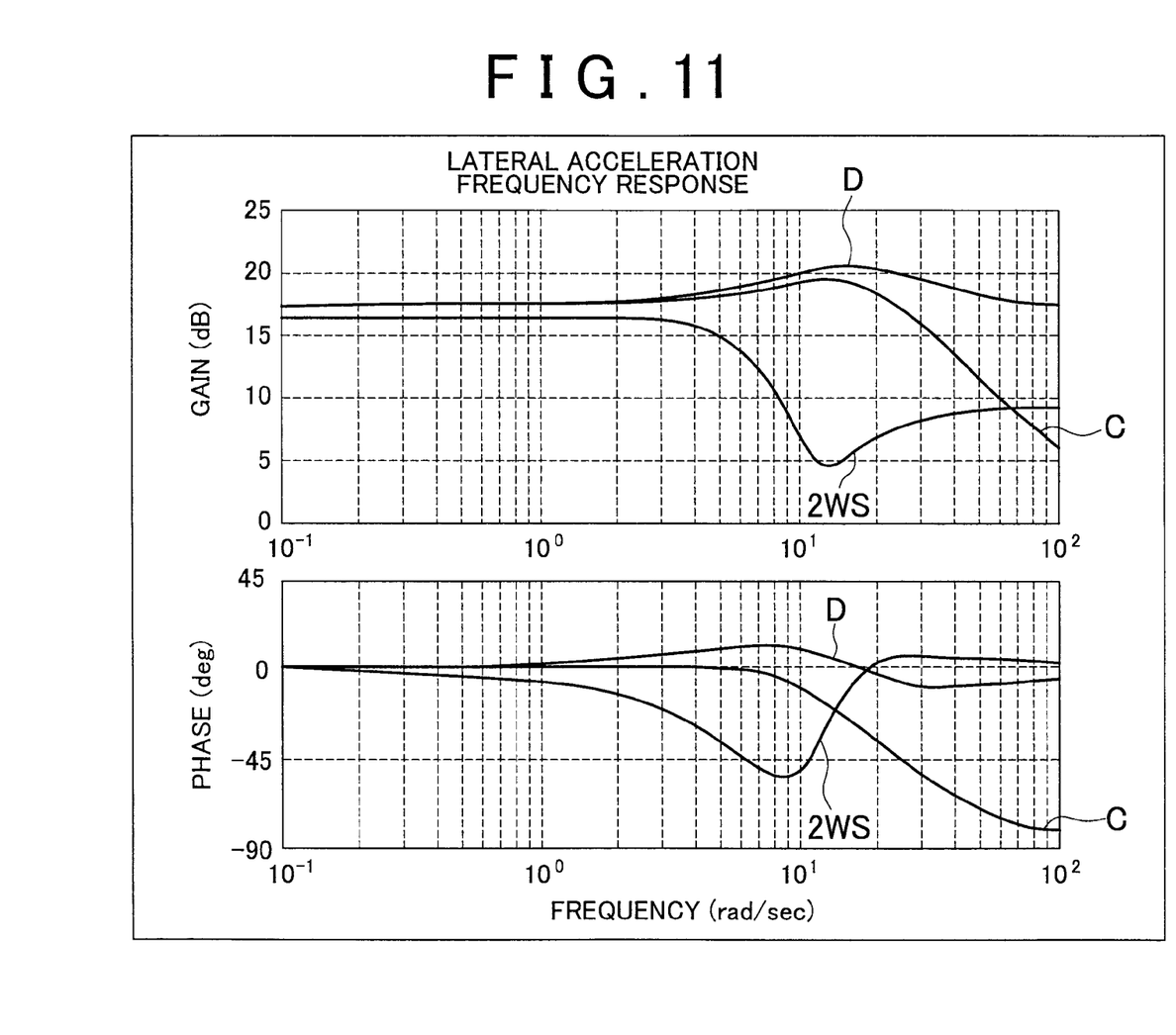
FIG. 11 is a Bode diagram showing a frequency response of the lateral acceleration of the control rule in accordance with the second embodiment.

During this state, the lateral shift and the turning become substantially equal in responsiveness. As shown in FIG. 11, regarding a curve C of the frequency response of the lateral acceleration at the time of the manual steering, the higher the frequency, the lower the gain becomes, and the greater the phase delay becomes.

Furthermore, as shown in FIG. 3, if any of the CC control, the ACC control and the LKA control is on (YES in S12), the control map is changed to another so as to restrain the responsiveness in the turning and raise the responsiveness in the lateral shift (S13).

Figure 7:
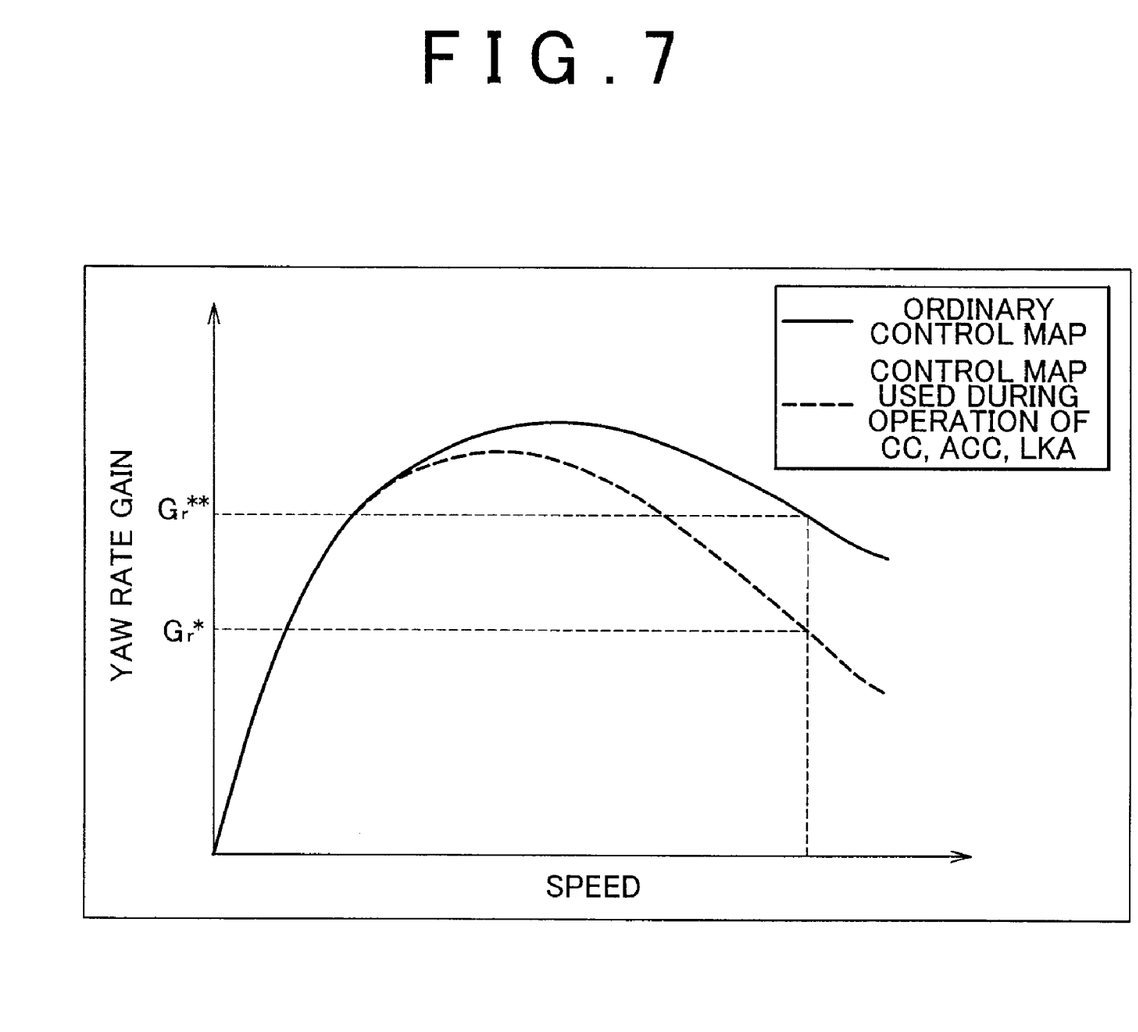
FIG. 7 is a diagram showing a control map of the yaw rate gain in accordance with a second embodiment.
Figure 8:
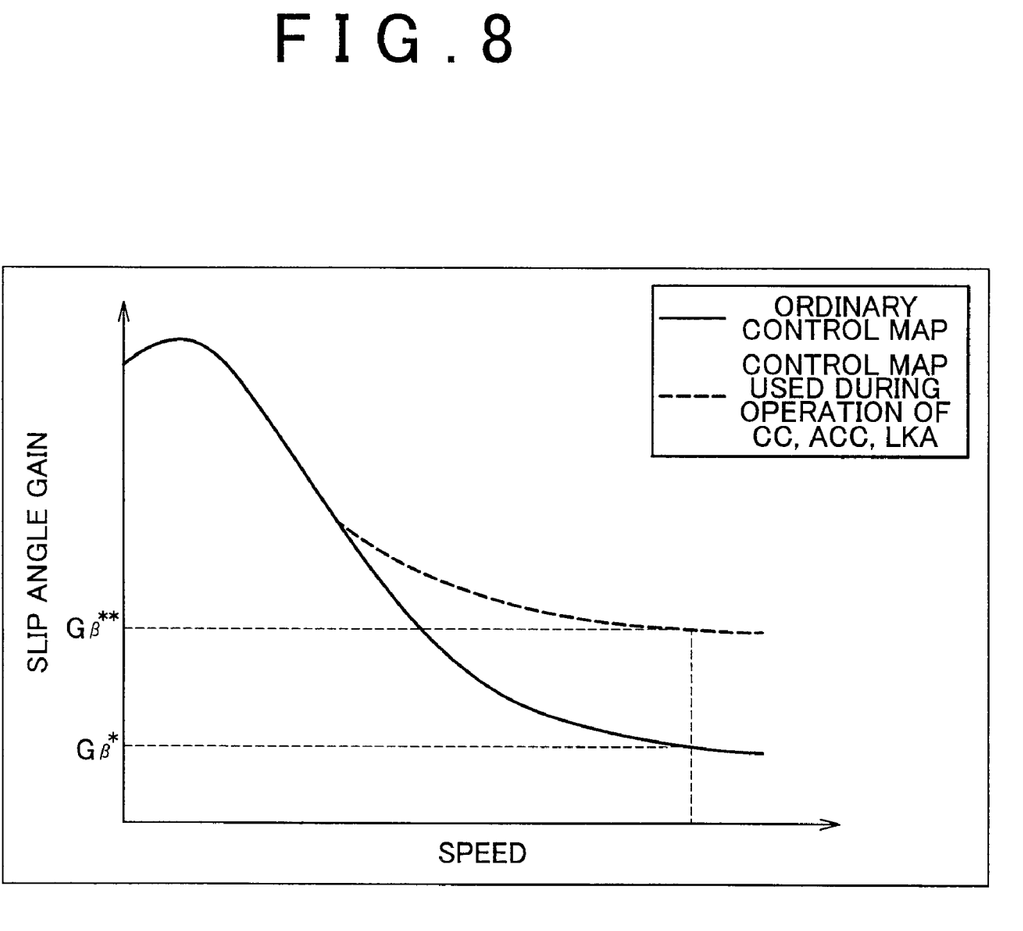
FIG. 8 is a diagram showing a control map of the slip angle gain in accordance with the second embodiment.
Figure 9:
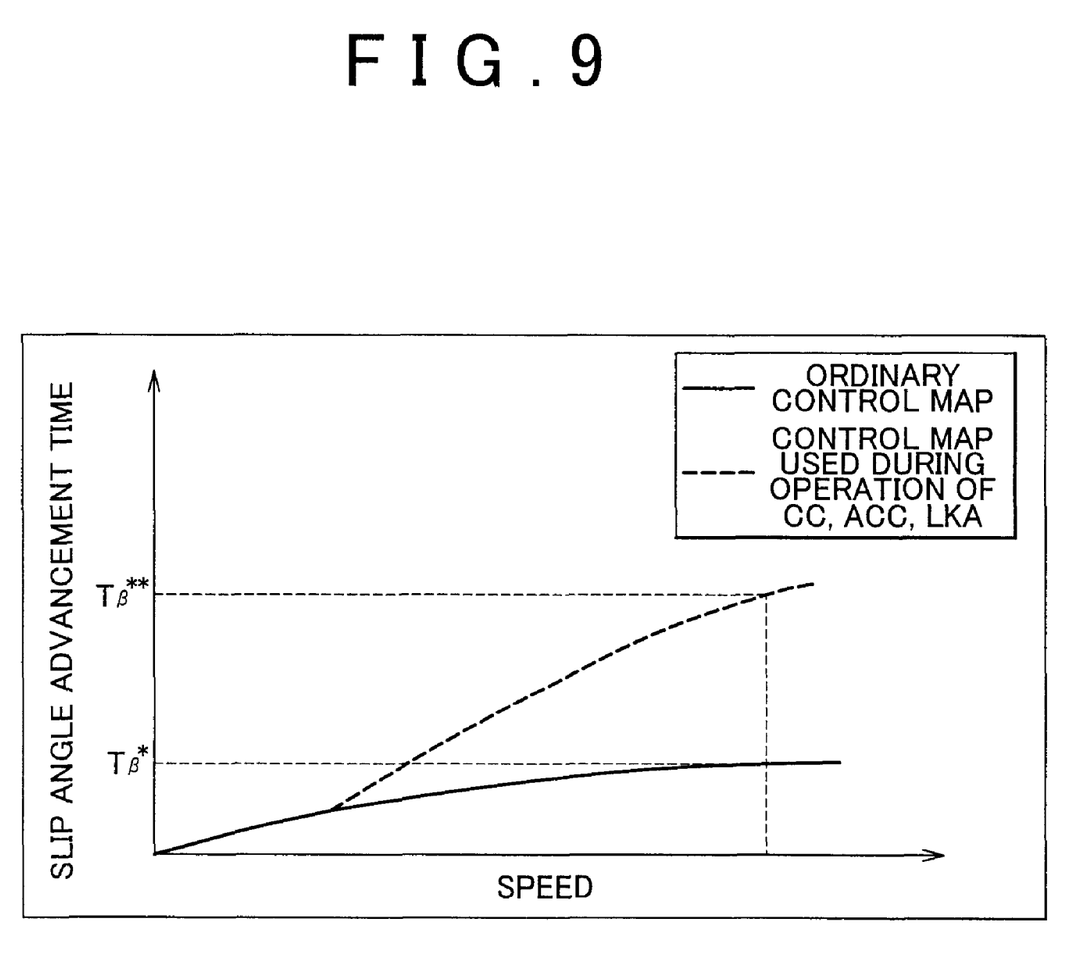
FIG. 9 is a diagram showing a control map of the slip angle advancement time in accordance with the second embodiment.

FIG. 7 is a diagram showing a control map of the yaw rate gain in accordance with the second embodiment, and FIG. 8 is a diagram showing a control map of the slip angle gain, and FIG. 9 is a diagram showing a control map of the slip angle advancement time. As shown in FIG. 7, when any of the CC control, the ACC control and the LKA control is performed, the yaw rate gain is decreased to restrain the responsiveness in the turning. On the other hand, as shown in FIGS. 8 and 9, the slip angle gain and the slip angle advancement time are increased to raise the responsiveness in the lateral shift when any of the CC control, the ACC control and the LKA control is performed.

The target yaw rate γ and the target slip angle β in the case where the control map has been changed become as shown in the following expressions (14) and (15).

EXPRESSION 10

$$\frac{\gamma^{**}(s)}{\delta(s)} = \frac{\omega_n^{*2}}{s^2 + 2 \cdot \zeta^* \cdot \omega_n^* \cdot s + \omega_n^{*2}} \cdot (1 + T_\gamma^* \cdot s) \cdot G_\gamma^{**} \quad (14)$$

$$\frac{\beta^{**}(s)}{\delta(s)} = \frac{\omega_n^{*2}}{s^2 + 2 \cdot \zeta^* \cdot \omega_n^* \cdot s + \omega_n^{*2}} \cdot (1 + T_\beta^* \cdot s) \cdot G_\beta^{**} \quad (15)$$

Figure 10:
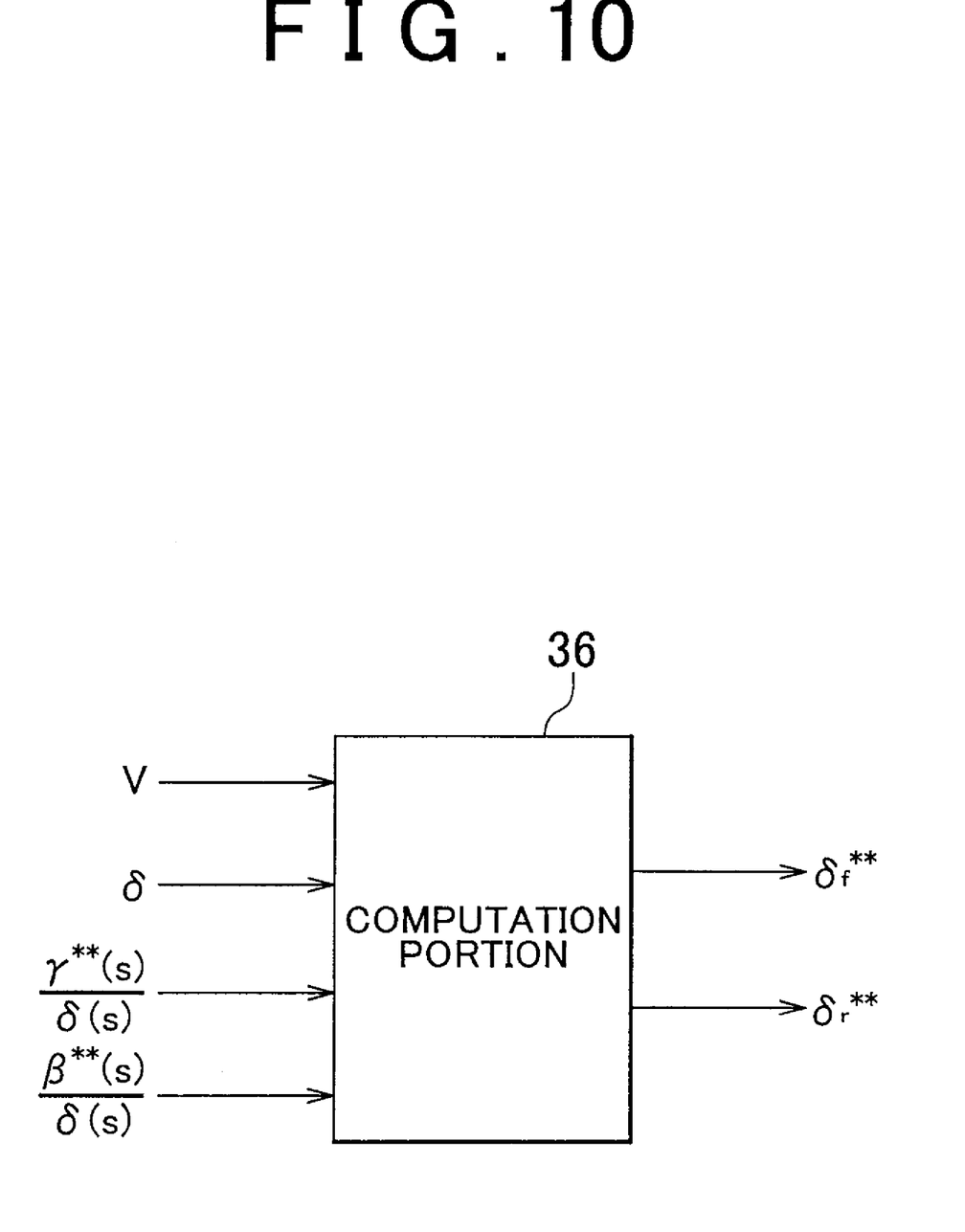
FIG. 10 is a block diagram showing a control rule of a computation portion at the time of the automatic steering in accordance with the second embodiment.

At this time, the control rule of the target lateral acceleration LA becomes as shown in the following expression (16). As shown in FIG. 10, the computation portion 36 of the A4WS-ECU 18 calculates a front wheel steering angle δ$_f$ and a rear wheel steering angle δ$_r$ corresponding to the target lateral acceleration LA.

EXPRESSION 11

$$\frac{LA^{}(s)}{\delta(s)} = V \cdot \left(\frac{\gamma^{}(s)}{\delta(s)} + s \cdot \frac{\beta^{**}(s)}{\delta(s)}\right) \quad (16)$$

In this case, the phase delay of the lateral acceleration relative to the steering handle angle becomes less, and the frequency response of the lateral acceleration becomes as shown by a curve D in FIG. 11.

According to this embodiment, during the execution of the CC control, the ACC control or the LKA control, during which the contribution of the target automatic control amount is larger in the setting of the target steering amount than the contribution of the manual steering amount, the A4WS-ECU 18 changes control maps so as to better the responsiveness in the lateral shift relatively to the responsiveness in the turning, in comparison with during the manual steering. Therefore, since during the automatic control, the A4WS-ECU 18 sets the target steering amount so as to better the responsiveness in the lateral shift relatively to the responsiveness in the turning, the stabilization of the vehicle can be further improved and the driver can be caused to feel secured and comfortable during the automatic steering.

A third embodiment of the invention will be described. This embodiment is different from the above-described first embodiment in that during the automatic steering, the responsiveness in the turning is restrained and the responsiveness in the lateral shift is raised by performing such a correction that the rear wheel steer angle becomes large on the basis of the LKA-ESP torque.

Figure 12:
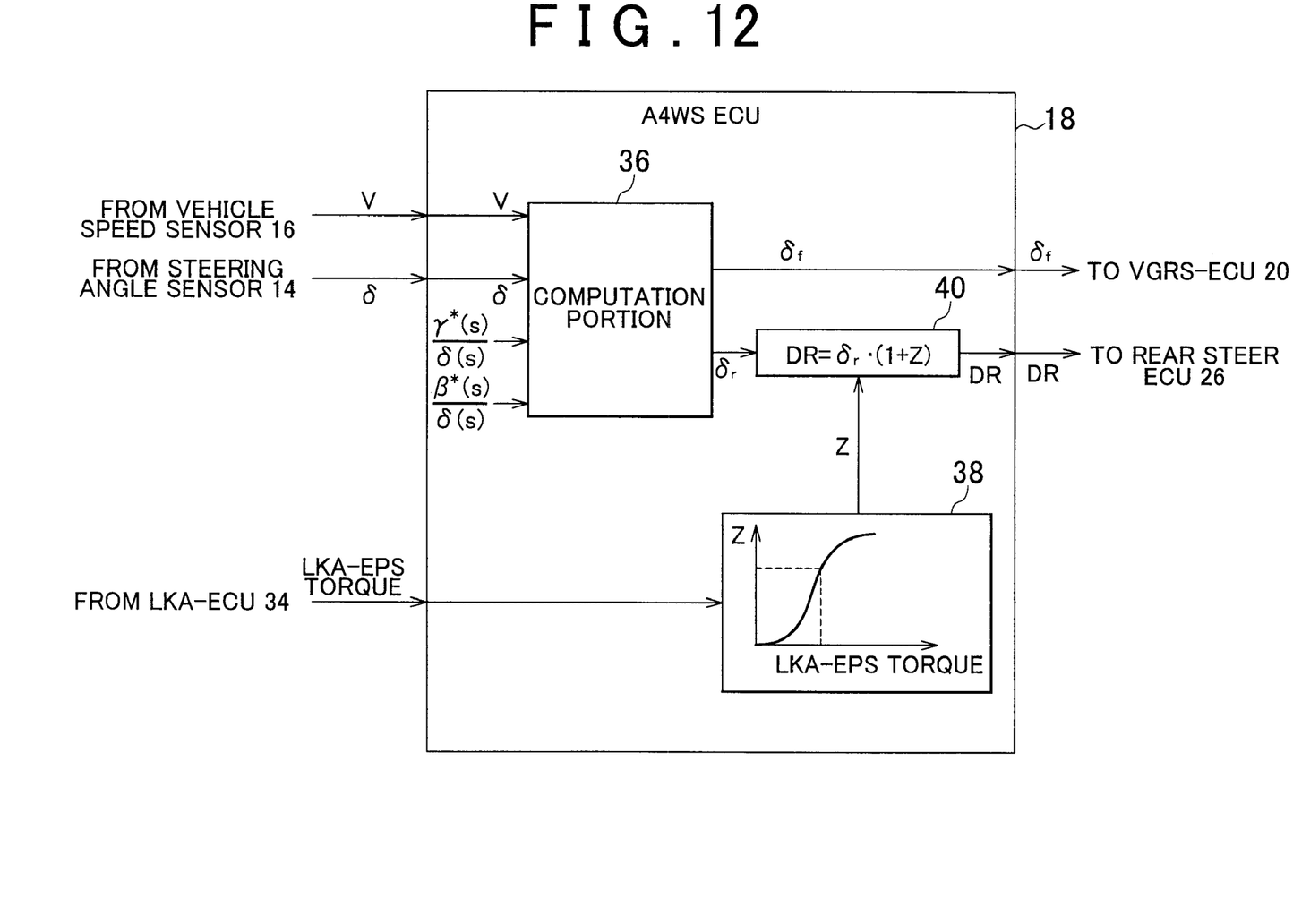
FIG. 12 is a block diagram showing a construction of an A4WS-ECU in accordance with a third embodiment.

FIG. 12 is a block diagram showing a construction of an A4WS-ECU in accordance with the third embodiment. As shown in FIG. 12, the A4WS-ECU 18 of this embodiment includes not only the computation portion 36 but also a correction coefficient-calculating portion 38 that calculates a rear wheel steer angle correction coefficient Z from the LKA-ESP torque output by the LKA-ECU 34, and a final rear wheel steer angle-calculating portion 40 that calculates a final rear wheel steer angle DR from the rear wheel steering angle $\delta_r$ calculated by the computation portion 36. The final rear wheel steer angle DR calculated by the final rear wheel steer angle-calculating portion 40 is output to the rear steer ECU 26, so that the rear steer actuator 28 is accordingly driven.

Figure 13:
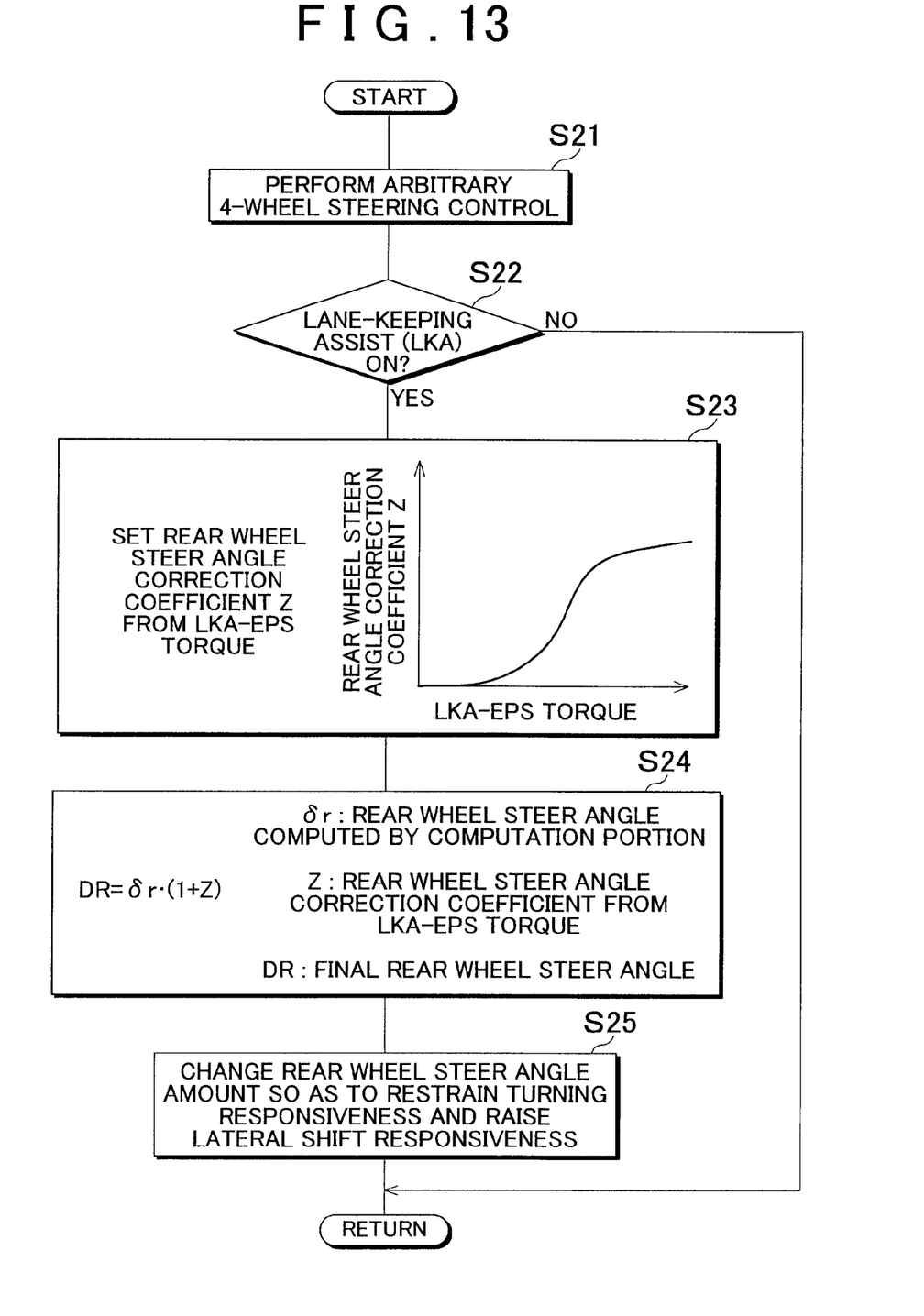
FIG. 13 is a flowchart showing an operation of the vehicle steering control device in accordance with the third embodiment.

FIG. 13 is a flowchart showing an operation of the vehicle steering control device in accordance with the third embodiment. As shown in FIG. 13, if the LKA control becomes on (S22) from a state where the vehicle steering control device is performing an arbitrary four-wheel steering control (S21), the correction coefficient-calculating portion 38 of the A4WS-ECU 18 calculates the rear wheel steer angle correction coefficient Z through a function of the rear wheel steer angle correction coefficient Z that uses the LKA-ESP torque as a parameter (S23).

The final rear wheel steer angle-calculating portion 40 of the A4WS-ECU 18 calculates a final rear wheel steer angle DR using a correction expression $DR=\delta_r \cdot (1+Z)$ from the rear wheel steering angle $\delta_r$ calculated by the computation portion 36, and the rear wheel steer angle correction coefficient Z calculated by the correction coefficient-calculating portion 38 (S24).

The rear steer ECU 26, after receiving the final rear wheel steer angle DR from the final rear wheel steer angle-calculating portion 40, performs such a steering control as to change the rear wheel steer angle amount to an increased amount and thus restrain the responsiveness in the turning and raise the responsiveness in the lateral shift (S25).

According to the embodiment, during the automatic control, the A4WS-ECU 18 sets the target steering amount so that the steering amount of the rear wheels becomes relatively large. Therefore, the amount of the turning is restrained and, on the other hand, the responsiveness in the lateral shift is further improved. Hence, the stabilization of the vehicle can be further improved, and the driver can be caused to feel secured and comfortable.

While embodiments of the invention have been described above, the invention is not limited to the foregoing embodiments, but may also be modified in various manners.

What is claimed is:

1. A vehicle steering control device configured to execute automatic steering and manual steering, comprising:
    an automatic control amount-setting device that sets a target automatic control amount based on information about a behavior of a vehicle and about an ambient environment;
    a steering control amount-setting device that sets a target steering amount based on a manual steering amount input by a driver and the target automatic control amount set by the automatic steering amount-setting device; and
    a steering device that steers the vehicle based on the target steering amount set by the steering control amount-setting device,
    wherein when a contribution of the target automatic control amount is larger in setting of the target steering amount than the contribution of the manual steering amount, the steering control amount-setting device sets the target steering amount so as to raise a responsiveness in a lateral shift of the vehicle relative to the responsiveness in turning of the vehicle, in contrast with when the contribution of the target automatic control amount is equal to or smaller in setting of the target steering amount than the contribution of the manual steering amount.

2. The vehicle steering control device according to claim 1, wherein the automatic control amount-setting device sets the target automatic control amount so that a predetermined vehicle speed is maintained.

3. The vehicle steering control device according to claim 2, wherein, when the target automatic control amount is set so that the predetermined vehicle speed is maintained, the steering control amount-setting device determines that the contribution of the target automatic control amount is larger in setting of the target steering amount than the contribution of the manual steering amount.

4. The vehicle steering control device according to claim 1, wherein the automatic control amount-setting device sets the target automatic control amount so that an inter-vehicle distance to a preceding vehicle is kept at a predetermined value.

5. The vehicle steering control device according to claim 4, wherein, when the target automatic control amount is set so that the inter-vehicle distance to the preceding vehicle is kept at the predetermined value, the steering control amount-setting device determines that the contribution of the target automatic control amount is larger in setting of the target steering amount than the contribution of the manual steering amount.

6. The vehicle steering control device according to claim 1, wherein the automatic control amount-setting device sets the target automatic control amount so that the vehicle runs in a predetermined lane.

7. The vehicle steering control device according to claim 6, wherein, when the target automatic control amount is set so that the vehicle runs in a predetermined lane, the steering control amount-setting device determines that the contribution of the target automatic control amount is larger in setting of the target steering amount than the contribution of the manual steering amount.

8. The vehicle steering control device according to claim 1, wherein when the contribution of the target automatic control amount is larger in the setting of the target steering amount than the contribution of the manual steering amount, the steering control amount-setting device sets the target steering amount so that a phase delay of a lateral acceleration of the vehicle relative to the steering amount becomes smaller than when the contribution of the target automatic control amount is equal to or smaller in the setting of the target steering amount than the contribution of the manual steering amount.

9. The vehicle steering control device according to claim 1, wherein the steering control amount-setting device raises the responsiveness in a lateral shift of the vehicle relative to the responsiveness in turning of the vehicle by changing a control map at a time when the automatic steering is executed.

10. The vehicle steering control device according to claim 1, wherein the steering device steers a front wheel and a rear wheel individually based on the target steering amount, and when the contribution of the target automatic control amount is larger in the setting of the target steering amount than the contribution of the manual steering amount, the steering control amount-setting device sets the target steering amount so that the steering amount of the rear wheel becomes larger than when the contribution of the target automatic control amount is equal to or smaller in the setting of the target steering amount than the contribution of the manual steering amount.

11. The vehicle steering control device according to claim 1, wherein the responsiveness in a lateral shift of the vehicle relatively to the responsiveness in turning of the vehicle is bettered when automatic control is executed by the automatic control amount-setting device than when manual control is executed by the driver.

12. A vehicle steering control method configured to execute automatic steering and manual steering, comprising:
setting a target automatic control amount based on information about behavior of a vehicle and about ambient environment;
setting a target steering amount based on a manual steering amount input by a driver and the set target automatic control amount set; and
steering based on the set target steering amount,
wherein when a contribution of the target automatic control amount is larger in setting of the target steering amount than the contribution of the manual steering amount, the target steering amount is set so as to raise a responsiveness in a lateral shift of the vehicle relative to the responsiveness in turning of the vehicle, in contrast with when the contribution of the target automatic control amount is equal to or smaller in the setting of the target steering amount than the contribution of the manual steering amount.

13. The vehicle steering control method according to claim 12, wherein the target automatic control amount is set so that a predetermined vehicle speed is maintained.

14. The vehicle steering control method according to claim 13, wherein, when the target automatic control amount is set so that the predetermined vehicle speed is maintained, it is determined that the contribution of the target automatic control amount is larger in setting of the target steering amount than the contribution of the manual steering amount.

15. The vehicle steering control method according to claim 12, wherein the target automatic control amount is set so that an inter-vehicle distance to a preceding vehicle is kept at a predetermined value.

16. The vehicle steering control method according to claim 15, wherein, when the target automatic control amount is set so that the inter-vehicle distance to the preceding vehicle is kept at the predetermined value, it is determined that the contribution of the target automatic control amount is larger in setting of the target steering amount than the contribution of the manual steering amount.

17. The vehicle steering control method according to claim 12, wherein the target automatic control amount is set so that the vehicle runs in a predetermined lane.

18. The vehicle steering control method according to claim 17, wherein, when the target automatic control amount is set so that the vehicle runs in a predetermined lane, it is determined that the contribution of the target automatic control amount is larger in setting of the target steering amount than the contribution of the manual steering amount.

19. The vehicle steering control method according to claim 12, wherein when the contribution of the target automatic control amount is larger in the setting of the target steering amount than the contribution of the manual steering amount, the target steering amount is set so that a phase delay of a lateral acceleration of the vehicle relative to the steering amount becomes smaller than when the contribution of the target automatic control amount is equal to or smaller in the setting of the target steering amount than the contribution of the manual steering amount.

20. The vehicle steering control method according to claim 12, wherein the responsiveness in a lateral shift of the vehicle is raised relative to the responsiveness in turning of the vehicle by changing a control map at the time when the automatic steering is executed.

21. The vehicle steering control method according to claim 12, wherein a front wheel and a rear wheel are individually steered based on the target steering amount, and wherein when the contribution of the target automatic control amount is larger in the setting of the target steering amount than the contribution of the manual steering amount, the target steering amount is set so that the steering amount of the rear wheel becomes larger than when the contribution of the target automatic control amount is equal to or smaller in the setting of the target steering amount than the contribution of the manual steering amount.

22. The vehicle steering control method according to claim 12, wherein the responsiveness in a lateral shift of the vehicle relatively to the responsiveness in turning of the vehicle is bettered when automatic control is executed than when manual control is executed.

23. A vehicle steering control device configured to execute automatic steering and manual steering, comprising:
an automatic control amount-setting device that sets a target automatic control amount based on information about a behavior of a vehicle and about an ambient environment;
a steering control amount-setting device that sets a target steering amount based on a manual steering amount input by a driver and the target automatic control amount set by the automatic steering amount-setting device; and
a steering device that steers the vehicle based on the target steering amount set by the steering control amount-setting device,
wherein when a contribution of the target automatic control amount is larger in setting of the target steering amount than the contribution of the manual steering amount, the steering control amount-setting device sets the target steering amount so as to raise a responsiveness in a lateral shift of the vehicle relative to the responsiveness in turning of the vehicle, in contrast with when the contribution of the target automatic control amount is equal to or smaller in setting of the target steering amount than the contribution of the manual steering amount, and
wherein when a contribution of the target automatic control amount is equal to or smaller in setting of the target steering amount than the contribution of the manual steering amount, the steering control amount-setting device sets the target steering amount so that the responsiveness in the lateral shift of the vehicle substantially equals the responsiveness in the turning of the vehicle.

* * * * *